US009542062B2

(12) United States Patent
Sproule et al.

(10) Patent No.: US 9,542,062 B2
(45) Date of Patent: *Jan. 10, 2017

(54) VIRTUALIZATION OF MOBILE DEVICE USER EXPERIENCE

(71) Applicant: Microsoft Technology Licensing, LLC, Redmond, WA (US)

(72) Inventors: William D. Sproule, Woodinville, WA (US); Antonio Winslow Fernando, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 439 days.

This patent is subject to a terminal disclaimer.

(21) Appl. No.: 14/053,539

(22) Filed: Oct. 14, 2013

(65) Prior Publication Data

US 2014/0047363 A1 Feb. 13, 2014

Related U.S. Application Data

(63) Continuation of application No. 11/474,303, filed on Jun. 23, 2006, now Pat. No. 8,560,595.

(51) Int. Cl.
| | | |
|---|---|---|
| G06F 3/048 | (2013.01) | |
| H04W 28/06 | (2009.01) | |
| H04M 1/725 | (2006.01) | |
| H04W 4/00 | (2009.01) | |
| H04W 88/02 | (2009.01) | |

(52) U.S. Cl.
CPC .......... *G06F 3/048* (2013.01); *H04M 1/72563* (2013.01); *H04W 28/06* (2013.01); *H04M 1/72525* (2013.01); *H04M 1/72561* (2013.01); *H04W 4/00* (2013.01); *H04W 88/02* (2013.01)

(58) Field of Classification Search
USPC ........................................................ 715/762
See application file for complete search history.

(56) References Cited

U.S. PATENT DOCUMENTS

| | | |
|---|---|---|
| 6,300,947 B1 | 10/2001 | Kanevsky |
| 7,577,659 B2 | 8/2009 | Schutz et al. |
| 8,560,595 B2 | 10/2013 | Sproule et al. |
| 2002/0059367 A1 | 5/2002 | Romero et al. |
| 2002/0059438 A1 | 5/2002 | Sarkisian |
| 2002/0144282 A1 | 10/2002 | Van Ee |
| 2003/0229900 A1 | 12/2003 | Reisman |
| 2004/0093432 A1 | 5/2004 | Luo et al. |
| 2004/0117439 A1 | 6/2004 | Levett et al. |
| 2004/0240408 A1 | 12/2004 | Gur |

(Continued)

FOREIGN PATENT DOCUMENTS

| | | |
|---|---|---|
| EP | 1632895 A1 | 3/2006 |
| EP | 1638324 A1 | 3/2006 |

(Continued)

*Primary Examiner* — Matthew Ell
(74) *Attorney, Agent, or Firm* — John Jardine; Daniel Choi; Micky Minhas

(57) ABSTRACT

A device virtualization service (DVS) is provided that uses a generalized thick client resident on a mobile device to provide user interface generation support to a myriad of services providing mobile device content. The DVS abstracts device specifics from services to provide device independent user experiences to be described by the service and then rendered on the device.

20 Claims, 5 Drawing Sheets

(56) References Cited

U.S. PATENT DOCUMENTS

| | | |
|---|---|---|
| 2005/0005259 A1 | 1/2005 | Avery et al. |
| 2005/0197157 A1* | 9/2005 | Li .................... H04M 1/72561 |
| | | 455/556.2 |
| 2006/0047845 A1 | 3/2006 | Whited et al. |
| 2006/0095576 A1 | 5/2006 | Perry et al. |
| 2006/0253584 A1 | 11/2006 | Dixon et al. |

FOREIGN PATENT DOCUMENTS

| | | |
|---|---|---|
| JP | 06-250959 A | 9/1994 |
| JP | 11-038958 A | 2/1999 |
| JP | 2003-529141 A | 9/2003 |
| JP | 2003-323402 A | 11/2003 |
| JP | 2004-173285 A | 6/2004 |
| JP | 2005-322213 A | 11/2005 |
| JP | 2006-134294 A | 5/2006 |
| RU | 2004131027 A | 4/2006 |
| WO | WO 02/065286 A2 | 8/2002 |
| WO | WO 03/096669 A2 | 11/2003 |
| WO | WO 2004/040884 A1 | 5/2004 |
| WO | WO 2004/102338 A2 | 11/2004 |
| WO | WO 2006/061595 A1 | 6/2006 |

* cited by examiner

VIRTUALIZATION OF MOBILE DEVICE USER EXPERIENCE

CROSS REFERENCE TO RELATED APPLICATIONS

This application is a continuation of U.S. patent application Ser. No. 11/474,303 filed on Jun. 23, 2006, the entirety which is incorporated herein by reference.

BACKGROUND

User satisfaction with a program, application, or service running on a mobile device often depends on the user interface (UI) associated with the mobile device. With some mobile devices, a UI is supplied to a mobile device via the Internet. With web-based provisioning of a user interface, a web page is built on a server and provided to the user through the web browser available on the mobile device. The interactivity between the user and the web page is limited to the browser's rendering capabilities, which also limits the interactivity between the user and the program. Mobile devices also have a limited bandwidth of communication. A lower bandwidth can create higher latency for the receipt and transmission between the web page produced on the user's mobile device and the application resident on an external server.

A UI may also be associated with a mobile device by downloading the entire program or application to the mobile device. The entire program may consume a large portion of the memory of the mobile device. Also, a UI may be associated with a mobile device by downloading a "thick client" to the mobile device. The variety of mobile devices available and the variety of thick clients may result in compatibility problems that arise as these types of clients are used. Also, building a thick client for each of the various mobile device results in development, testing and economic inefficiencies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A device virtualization service provides a generic thick client to a mobile device. The generic thick client facilitates providing customizable user interfaces on multiple mobile device platforms without requiring the developer to generate the user interface to write specialized code for each mobile device model. In this manner, Internet services may provide data and information to mobile devices without regard to the type of device on which the information is being rendered.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF ILLUSTRATIVE EMBODIMENTS

Figure 1:
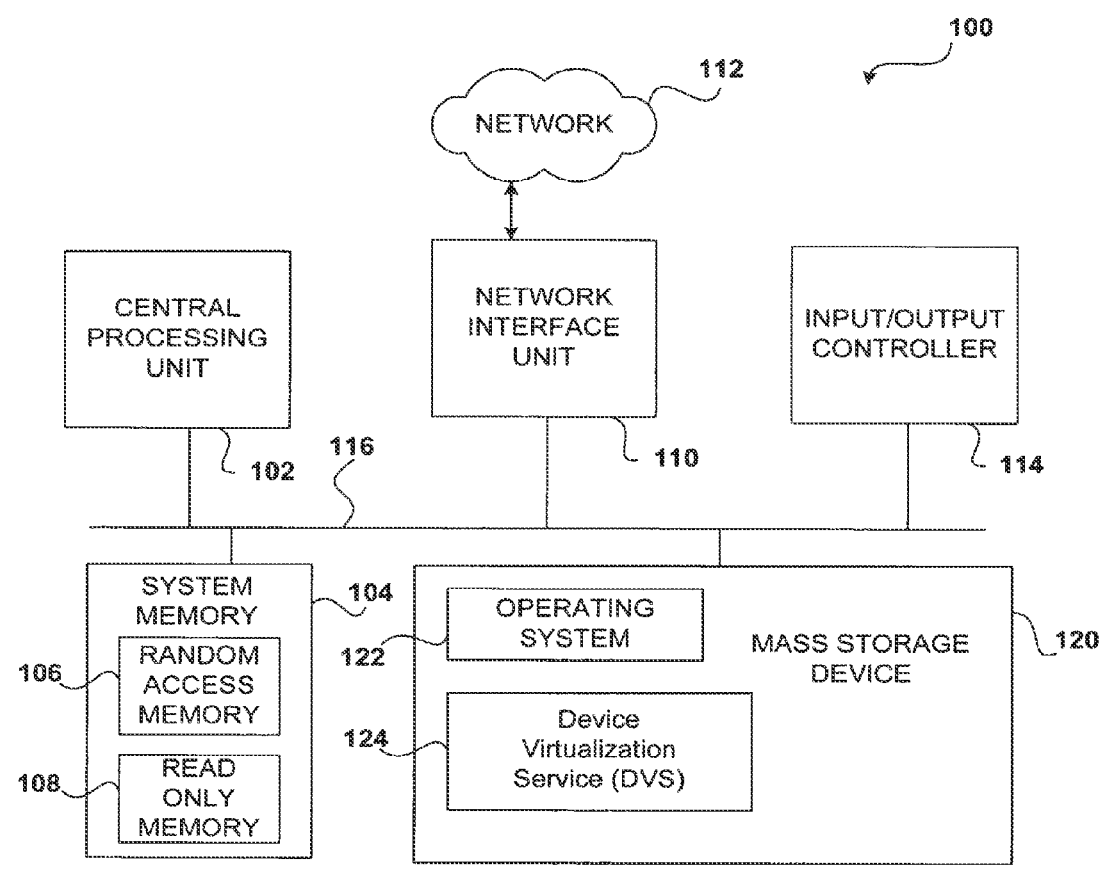
FIG. 1 illustrates an exemplary computing architecture for a computer.

Embodiments are herein described more fully below with reference to the accompanying drawings, which form a part hereof, and which show specific examples for practicing the embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments disclosed may be practiced as methods, systems or devices. Accordingly, embodiments disclosed may take the form of an entirely hardware implementation, an entirely software implementation or an implementation combining software and hardware aspects. The following detailed description is, therefore, not to be taken in a limiting sense.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture for a computing device 100 utilized in various embodiments will be described. The computer may be configured as a personal computer, a mobile computer and the like. As shown, computing device 100 includes a central processing unit 102 ("CPU"), a system memory 104, including a random access memory 106 ("RAM") and a read-only memory 108 ("ROM"), and a system bus 116 that couples the memory to the CPU 102. The computing device 100 further includes a mass storage device 120 for storing an operating system 122, application programs, and other program modules, which will be described in greater detail below.

The mass storage device 120 and its associated computer-readable media provide volatile and non-volatile storage for the computing device 100. The computer-readable media may include any type of removable and/or non-removable media.

The computing device 100 operates in a networked environment using logical connections to remote computers through a network 112, such as the Internet. The computing device 100 may connect to the network 112 through a network interface unit 110 connected to the bus 116.

The computing device 100 may also include an input/output controller 114 for receiving and processing input from a number of devices, such as: a keyboard, mouse, electronic stylus and the like. Similarly, the input/output controller 114 may provide output to a display screen, a printer, or some other type of device (not shown).

As mentioned briefly above, a number of program modules and data files may be stored in the mass storage device 120 and RAM 106 of the computing device 100, including an operating system 122 suitable for controlling the operation of a networked computer. The mass storage device 120 and RAM 106 may also store one or more program modules. In particular, the mass storage device 120 and the RAM 106 may store a device virtualization service (DVS) module 124.

The configuration of DVS module 124 is dependent on whether the computing device has been configured as a service provider server that provides service data and interaction, a DVS server that configures data for transmission to a mobile device, or a mobile device itself. For a service provider computing device, DVS module 124 provides configuration files and communication protocols for communicating data to the DVS server in a generalized format. For DVS server, DVS module 124 provides translation and packaging configuration data for translating data received from the service server. The DVS module 124 packages the data for efficient transmission to the mobile device. For the mobile device itself, DVS module 124 may include a thick client application for rendering the resulting user interface on the screen of the mobile device. A thick client (also known as a fat client or rich client) is a client that performs data processing operations, and relies on an associated server for data storage.

Throughout the specification and claims, the following terms take the meanings explicitly associated herein, unless the context clearly dictates otherwise. In some aspects, "Device Virtualization Service" or "(DVS)" refers to any portion of a network configuration, whether referring to the server side or client side in the communication, for generating a user interface on a mobile device from generalized data passed through a DVS server.

In some aspects, "DVS server" refers to a server that is configured to obtain generalized data from services, facilitate translating and packaging the generalized data into an optimized format, facilitate forwarding the optimized data to a mobile device, facilitate event handling for communication between the mobile device and the service, as well as perform other additional tasks.

In some aspects, "Event" refers to an interaction with the user interface rendered on the mobile device that triggers communication back to and from the service associated with the user interface.

In some aspects, "Widget" refers to a user interface element for providing a user experience (UX). As one exemplary definition for a widget, a widget may be an interface component such as a display frame or a text box.

The Device Virtualization Service (DVS) facilitates projecting a user experience (UX) onto a mobile device. In one embodiment, the DVS provides an interface (API) that allows the service to provide a set of User Interface (UI) pages which in turn lay out widgets of those pages. The widgets may include data tables for efficient storage of the data included on the pages. The Device Virtualization Service (DVS) abstracts device specifics from services that want to expose an end-user experience on the device. The DVS provides a device independent UX to be described by the service and then rendered on the device. The DVS may also enable a service to obtain device capabilities such as screen size, audio and video COmpress/DECompress technology (CODEC) supported so that the service can provide appropriate media to the device.

Figure 2:
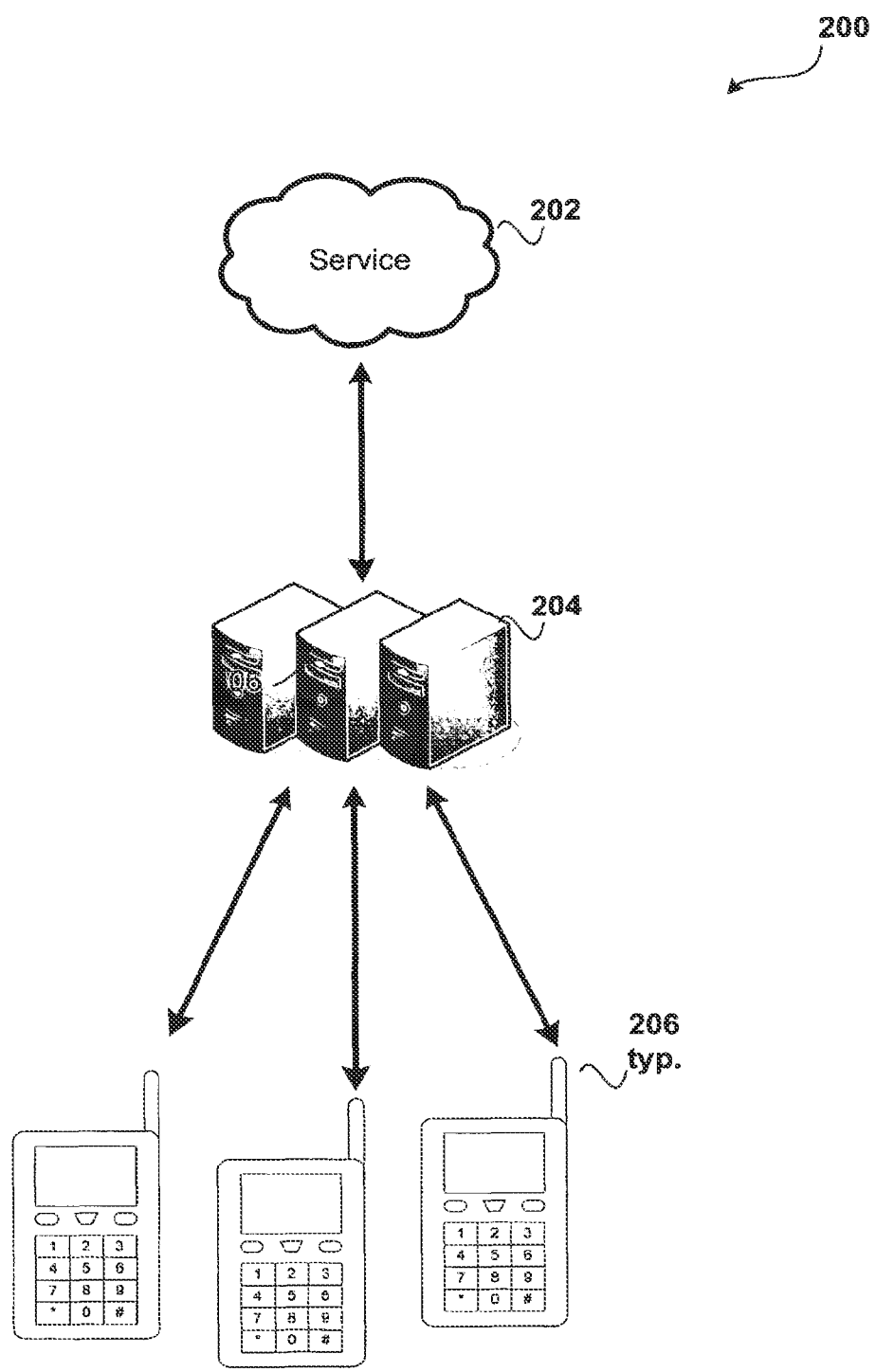
FIG. 2 illustrates an exemplary system for providing a device virtualization service.

FIG. 2 illustrates an exemplary system for providing a device virtualization service, in accordance with the present disclosure. The system includes service 202, DVS server(s) 204, and mobile devices (e.g., 206).

Service 202 may correspond to a service for providing media, or another service for providing news or sports headlines. The particular type of service may vary without affecting the scope or applicability of the disclosure. Service 202 may be physically represented by a server or other computing device that stores and manages data. particular to the service and is responsible for communication of the data to other devices.

DVS server 204 is configured to receive data from service 202, package the data for transmission, transmit the data to the mobile device (e.g., 206) for rendering, handle events that occur on the mobile device, and communicate those events. A more detailed discussion of the operation of DVS server 204 is provided below in the discussion of FIG. 3.

Once the packaged data is received at the mobile device (e.g., 206), the mobile device uses a DVS generalized thick client to render the data. The generalized thick client may render a user interface for multiple services without having customized programming resident on the mobile device for each service. A more detailed discussion of the processes involved for system 200 are provided below in the discussion of FIG. 4.

FIG. 2 does not depict an exhaustive representation of the elements associated with a DVS. Additional or fewer elements may be included and the DVS still operate for its intended purpose. For example, in an alternative embodiment, a service provides programs for storage on a DVS server so that communication is provided directly between the DVS server and mobile devices subscribed to the service. In such an alternative embodiment, the DVS server does not need to forward the data to the service provider.

An application programming interface (API) allows the service to obtain a set of device characteristics to customize the data it provides for a specific mobile device. For instance, the service may determine the pixel resolution of the device, the media formats the device supports, which media settings provide the optimal device playback, and the like.

A typical service, such as a music service, often provides a series of page layouts for the various different portions of their service experience. For example, the music service may include a browse by artist page, a browse by genre page, and the like. The music service may also provide a media preview page and a purchase confirmation page. The navigation between the pages is defined by behaviors attached to one or more widgets on the pages. In this way, the service has substantial control over the flow of the UI.

Figure 3:
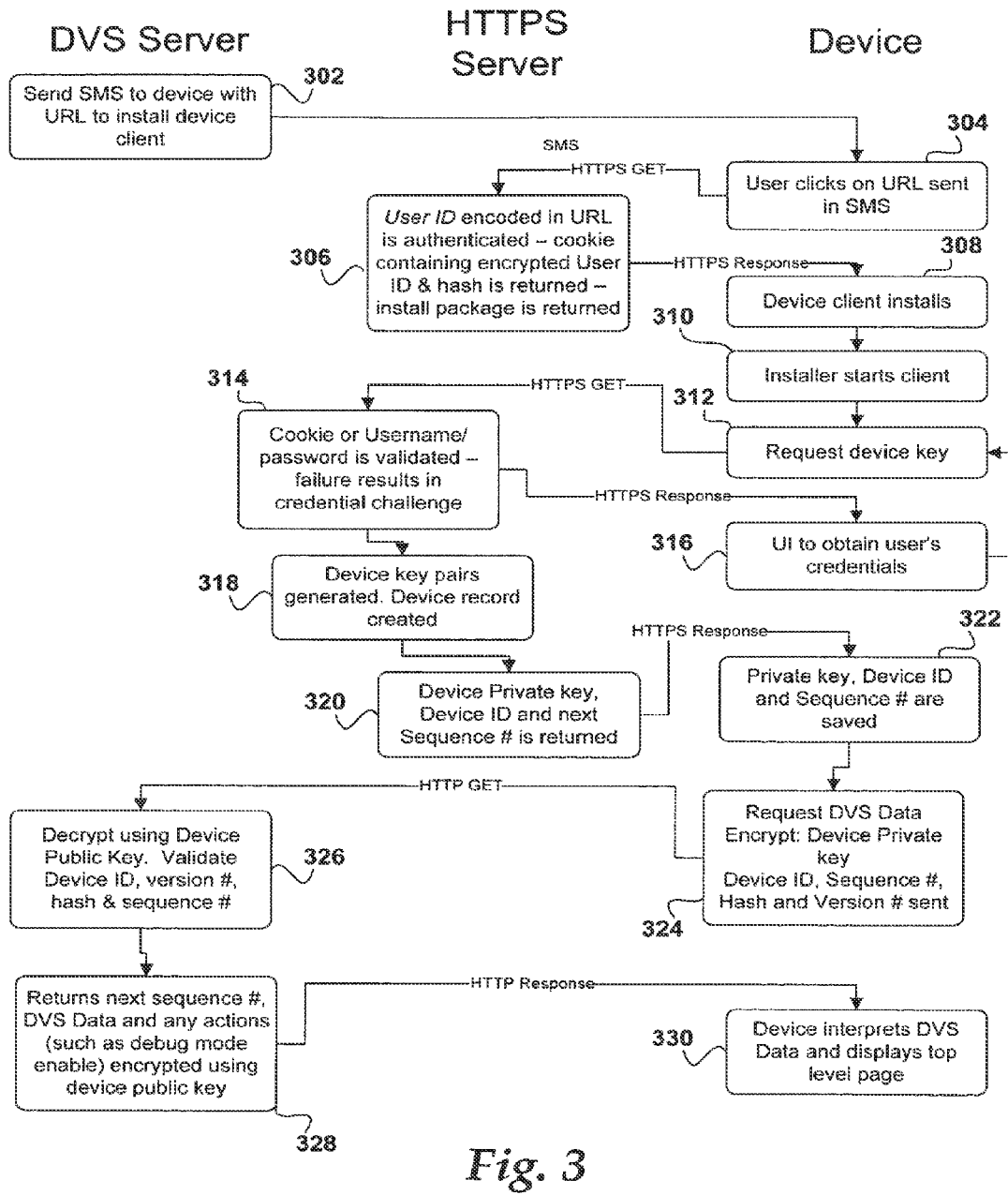
FIG. 3 illustrates an operational flow diagram for provisioning a mobile device for accepting service data using a device virtualization service (DVS)

FIG. 3 illustrates an operational flow diagram for provisioning a mobile device for accepting service data using the device virtualization service (DVS). Process 300 starts when a mobile device user has selected to subscribe to a particular service (e.g., a music service). Processing continues at operation 302.

At operation 302, a message is sent to the mobile device with a network address where the mobile device can locate and download the generalized thick client. In one embodiment, the DVS server sends the mobile device a Short Messaging Service (SMS) message that includes a Uniform Resource Locator (URL) that indicates a location for downloading the generalized thick client. Processing continues at operation 304.

At operation 304, the user selects or clicks on the URL sent in the SMS message to commence the download process that downloads the generalized thick client to the mobile device. Processing continues at operation 306.

At operation 306, an Internet service server or HTTPS server authenticates a User ID that was encoded in the URL sent to the user's mobile device. The authentication ensures that the mobile device that sent the SMS message is the device receiving the downloaded client application. A cookie is sent to the mobile device that includes the encrypted user ID and hash so that the mobile device is identified as an authenticated mobile device for future communications. Along with the cookie, the generalized thick client is downloaded to the mobile device. Processing continues at block 308.

At block 308, the generalized thick client is installed on the mobile device. One or more installation wizards may be used for the installation, or other methods of installation may be used. Once the generalized thick client is installed, processing continues to operation 310.

At operation 310, the thick client is activated by the user for receiving data related to the service. Once the thick client is activated, processing continues to operation 312.

At operation 312, a device key is requested to authenticate that the user of the mobile device and the mobile device are authorized to access the service data. Processing continues at operation 314.

At operation 314, the cookie is validated to ensure that the mobile device is the mobile device authorized for viewing the service data. In another embodiment, a username/password may be used for validating the user of the mobile device as capable of viewing the service data. If authentication fails, the credentials of the user or the mobile device's credentials may be challenged. If challenged, processing moves to operation 316.

At operation 316, the user interface generating the rendered version of the service data may transition to request the user's credentials as a result of the credential challenge. A user interface screen may be presented for entering a user ID and password for authentication. Once the credentials are provided, processing returns to operation 312 where the mobile device may again be authenticated with the service server. Once authenticated, processing continues at operation 318.

At operation 318, device key pairs are generated for securing the communication of the service to the mobile device. A device record is generated indicating the device is accessing the service data at this time. Processing continues at operation 320.

At operation 320, the device private key, device ID, and a next sequence number is returned to the mobile device. The device private key is used to authenticate the data's source as the data is received by the mobile device. The device ID provides a unique identifier of the device for the service, and may be used in future communications for expediting service data provisioning. The next sequence number indicates where the device is currently with regard to receiving the service data. For example, the service may be a news service that sends news items to mobile devices. If the user has not received the news service items in a while, that is reflected in the sequence number. Every news item since the time indicated by the sequence number may then be forwarded to the mobile device. Processing continues at operation 322.

At operation 322, the private key, device ID, and sequence number are saved to the mobile device. Processing then continues at operation 324.

At operation 324, the actual data for the service is requested from the DVS server. The DVS server is sent an encrypted version of the device private key, device ID, sequence number, and hash, along with a version number of the generalized thick client that the mobile device is running. Once the request is provided to the DVS server, processing continues with operation 326.

At operation 326, the DVS server decrypts the device ID, sequence number, hash, and version number using the public key of the private/public key pair and validates them. Processing then continues to operation 328.

At operation 328, the DVS server returns a next sequence number, the actual service data, and any special actions (e.g., debug mode enable) encrypted using the public key to the mobile device. Processing continues to operation 330.

At operation 330, the generalized thick client interprets the service data and displays the top level page for the service. Once complete, the user may then interact with the data, and processing moves to other tasks.

Process 300 is one aspect for provisioning the mobile device for receiving service data for rendering on a mobile device. Other methods may be used. Additionally, a higher level description of the interaction between the DVS server and the mobile device is provided below in the discussion of FIG. 4. It is understood however that the authentication processes depicted in process 300 are equally applicable to the other processes described herein.

Figure 4:
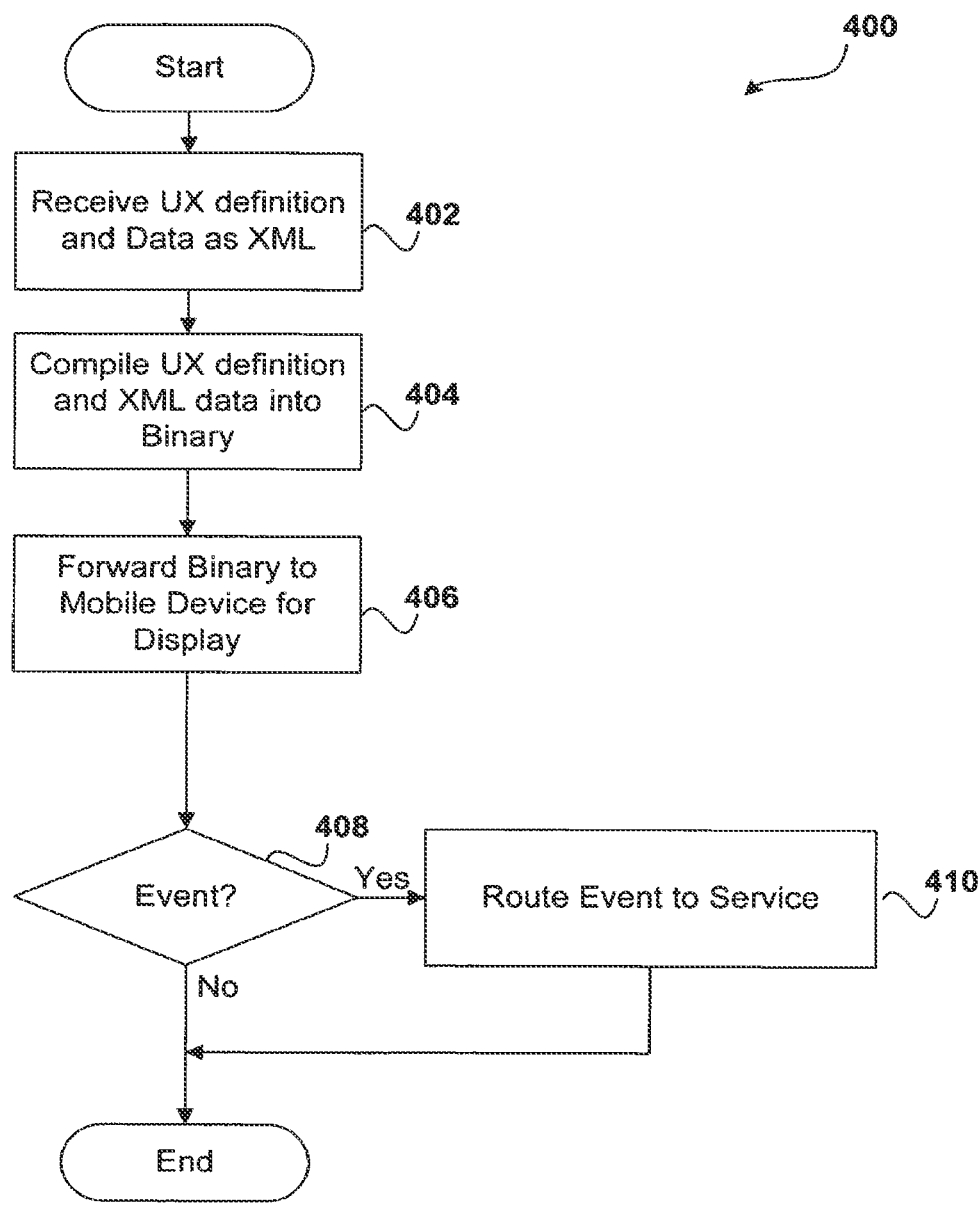
FIG. 4 illustrates an operational flow diagram of an exemplary process for the operation of a DVS server.

FIG. 4 illustrates an operational flow diagram of an exemplary process for the operation of a DVS server, in accordance with the present disclosure. Process 400 starts when a user experience (UX) definition is generated by a service and transmission of the UX definition to the DVS server has commenced. Processing continues with operation 402.

At operation 402, the UX definition is received by the DVS server. In one embodiment, the UX definition is provided as an Extensible Markup Language (XML) file. Other embodiments may receive the UX definition according to other formats. Processing continues at operation 404.

At operation 404, the UX definition file received from the service is compiled into binary code. The binary code is a compact form of the data that may be transmitted to the mobile device while preserving the limited bandwidth of communication. Once the binary is generated, processing continues to operation 406.

At operation 406, the binary code is forwarded to the mobile device for rendering the user interface for the service. In one embodiment, the binary code is forwarded according to the authentication processes described above with relation to FIG. 3. Processing continues with decision operation 408.

At decision operation 408, a determination is made whether an event has occurred with relation to the user interface rendered with the service data. An event notification may be received by the DVS server that indicates such an event (e.g., a mouse click). If an event has occurred, processing continues with operation 410.

At operation 410, the event is routed to the service server for handling. Once the event is routed to the service server, process 400 ends and moves onto other tasks, such as routing responses back to the mobile device, receiving additional events, or logging the mobile device out of the service session.

Figure 5:
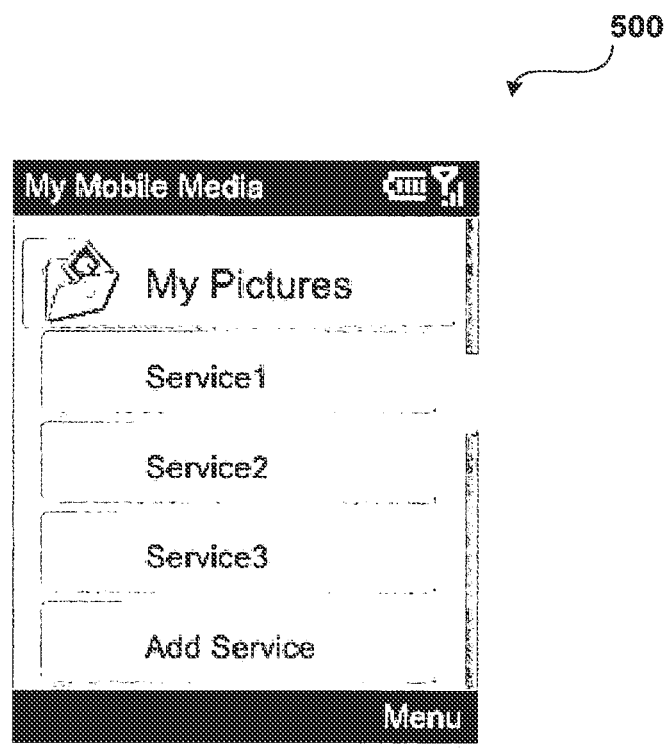
FIG. 5 illustrates a screen shot of a service user interface screen rendered by the generalized thick client, in accordance with the present disclosure.

FIG. 5 illustrates a screen shot of a service user interface screen rendered by the generalized thick client described in the present disclosure. The rendered screen corresponds to a page of the service. Each particular page is defined by a series of widget definitions which describe properties of the widget including its location on the page, bitmaps used for portions of the widget, fonts used and other properties that affect its behavior and appearance. Zero or more behaviors are attached to each widget to handle events the widget may generate such as click recognition events or other value changes. The behaviors correspond to actions, such as a move of focus to another widget, a move to another page, sending a catalog or media request to the service and the like. The layout of the widgets may be specified in absolute pixel coordinates or by using constraint based layout. Constraints may be used to specify a location or dimension relative to another widget, the screen/page dimensions or the text font dimensions. This allows a measure of device abstraction such that services do not have to provide page layouts for every different device screen resolution.

Many widgets may obtain their values by binding to the service provided data tables. The table formats and data are specified by the service. The aforementioned music service example may include tables for the artists, albums, genres and tracks. Tables may contain one or more fields whose values link to rows in other tables. For example, the artist and album tables would likely link to the genre table to indicate the genre for a particular artist or album. Similarly the album table would link to the artist table to indicate the artist of a particular album.

The binding may be associated in the page definition. A data binding is provided for a widget to link to a particular data table. The table may also be filtered to entries with a particular value in a field in the table. For example to display the albums by a particular artist, the album table may be filtered to rows in which the ArtistID field contains the selected ArtistID value. There may be an optional format specification provided to translate the value stored in the table into text that is displayable to the user. For example, a timestamp value (stored numerically) may be displayed in several different ways (h:mm, hh:mm, hh:mm:ss, etc.).

When the service has provided this DVS data to the DVS servers, as previously described, the data is "compiled" into a binary format appropriate for the user's mobile device. This allows a layer of abstraction between the services that use DVS and the device clients. Accordingly, the DVS may hide many of the differences between specific mobile device client implementations. For example, some devices may have the ability to expose the native media player via the user interface widgets provided by the generalized thick client. Other devices may only offer the ability to play audio via a native playback user interface that is separate from the service provided user interface. These differences may be abstracted so that the service does not require "knowledge" of the device specifics.

The device virtualization service may support mobile phones, mobile PDAs, laptops and desktops, television set to boxes and any other network connected device with a user interface. The user interface is generated with better bandwidth utilization due to the binary packaging of the data before transmission to the mobile device, and with better memory utilization by retaining data storage for producing the service content external to the mobile device. Additionally, service providers are able to provide a customized user interface without customized code for the various mobile device types currently available.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for providing a user interface for a networked service on a mobile device, comprising:
  a processor;
  a memory coupled to the processor, wherein the memory comprises instructions that upon execution by the processor configure the system to:
  provide information indicative of a location for download of a generalized thick client to a mobile device, wherein the generalized thick client is configured to provide a user interface on the mobile device for networked services;
  receive a request for data from the mobile device;
  request the data from a service provider, wherein the data received from the service provider is device independent;
  compile the data from the service provider into an optimized format for the mobile device; and
  responding to the device with the optimized formatted data.

2. The system of claim 1, wherein instructions that upon execution by the processor configure the system to provide a generalized thick client to a mobile device include instructions that upon execution by the processor configure the system to send a URL in an SMS message to indicate the location for downloading the generalized thick client.

3. The system of claim 2, wherein instructions that upon execution by the processor configure the system to download the generalized thick client include instructions that upon execution by the processor configure the system to authenticate a mobile device and send a cookie that includes an encrypted user ID and hash.

4. The system of claim 3, further comprising instructions that upon execution by the processor configure the system to validate the cookie to determine whether the mobile device is authorized to view service data when the mobile device requests the data.

5. The system of claim 1, wherein the generalized thick client includes a widget that includes a value associated with service provided data tables.

6. The system of claim 1, wherein the optimized format includes a format associated with characteristics of the mobile device.

7. The system of claim 6, wherein the characteristics of the mobile device include at least one of: screen size, audio CODEC, video CODEC, pixel resolution, and supported media format.

8. The system as recite in claim 1, wherein the compiled data comprises a binary form of XML data.

9. A mobile device, comprising:
a processor that upon execution of instructions configures the mobile device to:
receive a reference to a download location of a generalized thick client;
download the generalized thick client over a network based at least in part on the location, wherein the generalized thick client is configured to provide a user interface on the mobile device for networked services;
send a request for data;
receive compiled data in a compact form of the requested data that is an optimized format for the mobile computing device.

10. The mobile device of claim 9, wherein the reference to a download location comprises a URL in an SMS message to indicate a location for downloading the generalized thick client.

11. The mobile device of claim 10, wherein the instructions that configure the mobile device further comprise instructions to authenticate the mobile device by receiving a cookie that includes an encrypted user ID and hash.

12. The mobile device of claim 11, further comprising instructions that send information to validate the cookie to indicate that the mobile device is authorized to view service data when the mobile device requests the data.

13. The mobile device of claim 9, wherein the generalized thick client includes a widget that includes a value associated with service provided data tables.

14. The mobile device of claim 9, wherein the optimized format includes a format associated with characteristics of the mobile device.

15. The mobile device as recite in claim 9, wherein the data is comprised of XML.

16. A non-transitory computer readable memory device having stored therein computer readable instruction that upon execution on a computing device at least:
provides from a first computing device a generalized thick client to a mobile computing device over a network, wherein the generalized thick client is configured to provide a user interface on the mobile device for networked services;
receives at the first computer device a request for data from the mobile computing device;
receives data from a service provider computer that satisfies the request for data from the mobile computing device, wherein the data received from the service provider is device independent;
compiles the data from the service provider into a compact form of the data that is an optimized format for the mobile computing device; and
transmits the compiled data to the mobile computing device for use by the generalized thick client.

17. The non-transitory computer readable memory device of claim 16, wherein the computer readable instruction that upon execution on a computing device that at least provide a generalized thick client to a mobile device includes computer readable instruction that upon execution on a computing device at least send a URL in an SMS message to indicate a location for downloading the generalized thick client.

18. The non-transitory computer readable memory device of claim 17, wherein downloading the generalized thick client includes authenticating a mobile device and sending a cookie that includes an encrypted user ID and hash.

19. The non-transitory computer readable memory device of claim 18, further comprising computer readable instruction that upon execution on a computing device at least validate the cookie to determine whether the mobile device is authorized to view service data when the mobile device requests the data.

20. The non-transitory computer readable memory device of claim 16, wherein the generalized thick client includes a widget that includes a value associated with service provided data tables.

* * * * *